H. L. HARBAUGH AND F. HARWOOD.
VALVE.
APPLICATION FILED MAR. 17, 1919.
1,316,302.
Patented Sept. 16, 1919.
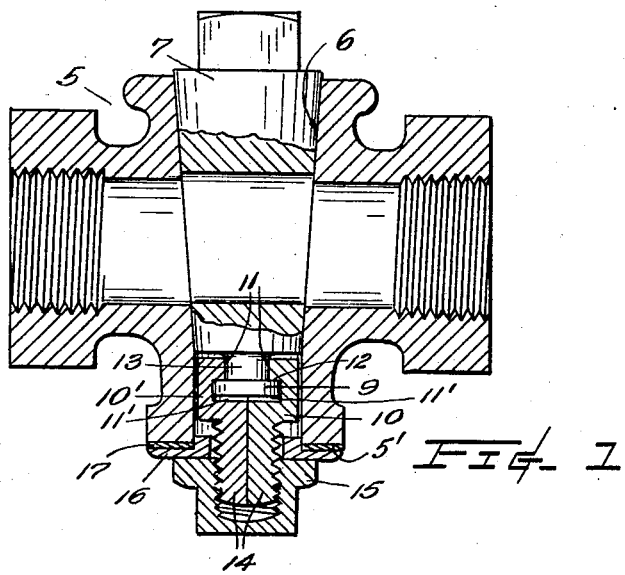
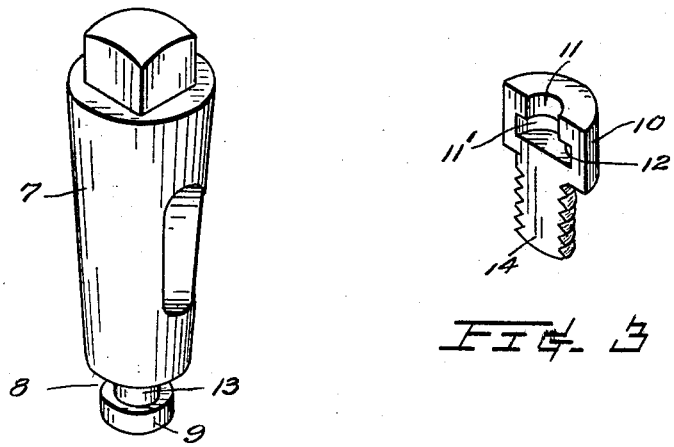
INVENTORS:
Harvey L. Harbaugh
and Frank Harwood
BY
Pierre James
ATTORNEY

UNITED STATES PATENT OFFICE.

HARVEY L. HARBAUGH AND FRANK HARWOOD, OF SEATTLE, WASHINGTON.

VALVE.

1,316,302.   Specification of Letters Patent.   Patented Sept. 16, 1919.

Application filed March 17, 1919. Serial No. 283,017.

*To all whom it may concern:*

Be it known that we, HARVEY L. HARBAUGH and FRANK HARWOOD, citizens of the United States, residing at Seattle, in the county of King and State of Washington, have invented certain new and useful Improvements in Valves, of which the following is a specification.

Our invention relates to improvements in valves; and the principal object of the improvements is to provide simple effective devices to adjustably retain the cock to its seat.

A further object of our improvements is the provision of means to prevent leakage about the cock.

With the above and other objects in view, the invention consists in the novel construction, combination and arrangement of parts hereinafter described and claimed.

In the accompanying drawings, Figure 1 is a vertical longitudinal sectional view of a valve embodying the present invention. Fig. 2 is a perspective view of the valve cock shown detached. Fig. 3 is a perspective view of one of the cock-regulating members.

The reference numeral 5 designates a valve body having a conical bore 6 for a similarly shaped plug or cock 7. Near its smaller end said cock is formed with a peripheral groove 8 and a substantially cylindrical head 9 of less diameter than the adjacent tapering portion of the cock.

Connected to the smaller end of the cock is a substantially cylindrical body which is divided diametrically through its axis to provide two complementary members 10 and $10^1$ (Fig. 1) and at one end formed with an opening 11 and communicating recesses $11^1$ to respectively accommodate the neck 13 and the head 9 of the cock, and when assembled furnish an annular shoulder 12 engaging said head around the neck 13. Said members are formed to provide mating half-stud elements 14 which are provided with complementary screw threads to take in a nut 15. 16 represents a metal washer surrounding said stud and 17 is a gasket or an equivalent which may advantageously be used between the lower end $5^1$ of the body and the washer 16 to provide a non-leakable joint at the end of the cock and supplemental to that afforded at the valve seat.

With the above described parts arranged as shown in Fig. 1 and by suitably screwing the nut 15 on the stud threads of the regulator and bearing against the washer 16 which, in turn, bears against the valve body or, as shown, against an interposed gasket 17, the cock is caused to be drawn down into the seat therefor provided by the body bore 6.

When thus adjusted, the cock is free to turn independently of the regulator.

It will be understood that changes and modifications in the details of the invention within the scope of the claims may be made without departing from the spirit of the invention or sacrificing any of the advantages thereof.

What we claim is—

1. The combination with a valve body having a conical bore, and a cock therefor, said cock being provided adjacent to its smaller end with a peripheral recess, of a regulator comprising complementary members having internal recesses to receive said head and provided with an externally screw-threaded stud, which protrudes from said body, a washer surrounding said stud, and a nut engaging the stud exteriorly of the body and adapted to coöperate with the latter to effect the axial movements of the cock.

2. The combination with a valve body having a conical bore, a cock fitting within said bore and provided at its smaller end with an extension comprising a cylindrical head connected to the cock proper by a relatively small neck, of a regulator comprising a cylindrical portion adapted to be inserted within the body bore, and a screw-threaded stud extending outside of the body from said cylindrical portion, said cylindrical portion being provided with an opening and a recess respectively for said neck and head, and a nut engaging the stud whereby said regulator is actuated to adjust the position of the cock axially thereof.

Signed at Seattle, Washington, this 4th day of March, 1919.

HARVEY L. HARBAUGH.
FRANK HARWOOD.

Witnesses:
PIERRE BARNES,
E. PETERSON.

Copies of this patent may be obtained for five cents each, by addressing the "Commissioner of Patents, Washington, D. C."